United States Patent [19]

Younkin et al.

[11] 4,382,769

[45] May 10, 1983

[54] CONTAINER FORMING APPARATUS

[75] Inventors: Harry A. Younkin, Newark, Del.; Gottfried Mehnert, Berlin; Uwe V. Roos, Bodenteich-Uelzen, both of Fed. Rep. of Germany

[73] Assignee: Hercules Incorporated, Wilmington, Del.

[21] Appl. No.: 249,723

[22] Filed: Mar. 31, 1981

[51] Int. Cl.³ .................... B29C 17/07; B29C 17/10
[52] U.S. Cl. ........................ 425/525; 264/532; 264/533; 425/527; 425/529; 425/531; 425/535
[58] Field of Search ............... 425/525, 529, 535, 527, 425/531; 264/532, 533

[56] References Cited

U.S. PATENT DOCUMENTS

| | | | |
|---|---|---|---|
| 3,009,196 | 11/1961 | Hagen | 264/533 |
| 3,209,401 | 10/1965 | Mehnert | 425/525 |
| 3,303,249 | 2/1967 | Strauss | 264/532 |
| 3,311,950 | 4/1970 | Strauss | 425/525 |
| 3,531,556 | 9/1970 | Mehnert | 264/533 |
| 3,651,186 | 3/1972 | Hall | 264/539 |
| 3,806,300 | 4/1974 | Hafele et al. | 425/525 |
| 3,892,830 | 7/1975 | Hudson et al. | 264/520 |
| 3,985,850 | 10/1976 | Seefluth | 29/281.1 |
| 3,989,786 | 11/1976 | Mehnert et al. | 264/536 |
| 4,065,535 | 12/1977 | LeGrand | 264/532 |
| 4,108,937 | 8/1978 | Martineu et al. | 264/529 |
| 4,116,607 | 9/1978 | LeGrand | 425/525 |

Primary Examiner—Jan H. Silbaugh
Attorney, Agent, or Firm—Stephen F. K. Yee

[57] ABSTRACT

A process and an apparatus for blow molding completely finished hollow plastic containers of biaxially oriented material and having a finished neck. A dual-diameter blow pin is positioned between separable mold sections and is movable along its longitudinal axis. A crammer sleeve is reciprocably disposed about the blow pin, and gripping jaws are positioned to close around the blow pin. One end of a heated tubular parison is positioned over a larger-diameter portion of the blow pin, and the parison is longitudinally stretched, axially orienting the material and causing the parison to neck down onto a smaller-diameter portion of the blow pin. The mold sections are closed over the stretched parison, the blow pin is longitudinally inserted to size the inside diameter of the neck opening, the crammer sleeve is inserted to cram axially-oriented material into the neck finishing cavity of the mold and to finish form the neck opening, and the tail surplus material is severed. Upon separation of the mold sections, the crammer sleeve and blow pin are retracted, with the withdrawal of the crammer sleeve removing the severed neck surplus material. The neck forming portions of the mold sections are designed for easy insertion of the blow pin and the provision of a controlled volume of oriented material for the crammer sleeve.

7 Claims, 7 Drawing Figures

CONTAINER FORMING APPARATUS

BACKGROUND OF THE INVENTION

1. Field of the Invention

This invention relates generally to blow molding, and is more particularly directed to the blow molding of completely finished, biaxially oriented hollow containers.

2. Description of the Prior Art

It is known in the prior art that the biaxial blow molding of hollow containers, such as bottles, from synthetic resins results in an article of improved physical properties, such as strength and transparency. Generally, in this blow molding technique, a cooled tubular preform or parison is heated to a suitable orientation temperature, stretched along its longitudinal direction to axially orient the material and then blown within a mold cavity.

In the blow molding of hollow containers, one particularly difficult problem is to produce large containers with standard-size neck and thread areas. In this situation, the cross-sectional area of the material in the neck is greater than in the remainder of the blown container. Accordingly, if a small parison is used to provide a small-diameter neck and threaded area, the walls of the remainder of the parison will be thinned unduly upon expansion during the blow molding process and detrimentally affect the strength of the container. Conversely, if a parison is used which has sufficient material to form walls of a relatively large container, the diameter of the neck and thread area will be too large, resulting in additional material being used unnecessarily in the formation of the container and possibly producing flash upon closure of the mold which would require additional processing to finish the container and thus add to the cost of production.

Certain physical characteristics of a container molded of biaxially oriented material, such as strength and clarity, are related to the axial draw ratio possible with a given parison size. The axial draw ratio is determined by the unstretched length of the parison and the length after stretching. These lengths are determined by the desired container size and weight which, in conjunction with the need to provide a standard-size neck and thread portion, define the parison size. Thus, there are techniques in the prior art for blow molding biaxially oriented containers in which the achievable axial draw ratios are limited and the maximum size of the containers which can be formed is restricted.

Biaxially oriented containers have been made by clamping a portion of the parison within neck-forming cavities before stretching of the parison. Techniques are also known in which preforms with finished neck portions molded in a first, preform molding procedure are then stretched and blow molded. The resulting containers have oriented material in the body, but the finished neck does not have oriented material. The neck region, therefore, lacks the clarity and strength that is partially obtainable in a container having at least axially-oriented material. To overcome this problem, processes have been developed which provide orientation of the material in the container neck region. Examples of such processes are disclosed in U.S. Pat. No. 3,651,186, issued to J. N. Hall and U.S. Pat. Nos. 4,065,355 and 4,116,607, issued to R. W. LeGrand. In U.S. Pat. No. 4,108,937, issued to Martineu et al., a cylindrical preform is stretched prior to blow molding of the container, resulting in orientation of the material in the neck region, and the material in this region is heated to a higher temperature to permit greater deformation. However, unlike the LeGrand process, the Martineu et al. process does not provide for the formation of closure attachment means on the neck surface such as threads nor is there a precise calibration of the neck opening inside diameter. Instead, in Martineu et al. the molded container is removed and a separate finishing operation is required to cut the upper portion of the container to produce the final form of the finished container.

In the LeGrand patents, a technique is disclosed for parison stretching and container neck forming in which oriented material is forced by a crammer sleeve into the thread forming area of the mold. The outside diameter of the crammer sleeve is substantially the same size as the outside diameter of the finished neck as measured at the base of the threads, and the outer diameter of the blow pin establishes the diameter of the opening in the finished neck. Since the parison must fit over the crammer sleeve, the inside diameter of the parison is accordingly fixed. This size constraint and the requirement of a standard-size neck fixes the ratio of the inside-to-outside diameters of the parison. The neck size is a critical factor since the parison's outside diameter in the container neck region, after stretching, must fit within the opening provided by the mold neck inserts to prevent flash formation. With the parison diameters thus fixed and the desired container's size and weight parameters determining the length of the parison, the axial draw ratio achieveable is also fixed for a given size container, mandrel and neck thread mold inserts. This technique, therefore, limits the flexibility in selection of the axial draw ratio.

A related problem in the prior art technique of forming containers of biaxially oriented material having finished necks is the provision of an adequate quantity of oriented material to form closure attachment means such as threads. Thus, in a technique such as disclosed in the aforesaid LeGrand patents in which the parison is axially stretched onto a calibrating blow pin and the mold sections closed to size the outer diameter of the container neck, there may be insufficient axially-oriented material available below the crammer sleeve to provide well-defined shapes for all the threads. Merely increasing the travel distance of the crammer to increase the amount of material disposed below the crammer is not a completely satisfactory solution since the crammer would then be required to pass through a larger quantity of axially-oriented material, which may adversely affect the capability of the crammer to form a smooth, cleanly-severed neck end surface. An excessive amount of oriented material below the crammer may also adversely affect the distribution of the material along the length of the container neck such that the threads and the lower end of the neck are improperly formed.

SUMMARY OF THE INVENTION

Accordingly, it is an object of the present invention to provide a process and apparatus for blow molding containers of biaxially oriented material.

Another object of the invention is to provide a process and apparatus of the foregoing type for blow molding containers having oriented material in the body and in the neck portions.

Another object of the invention is to provide a process and apparatus of the foregoing type for blow molding a completely finished container within the mold.

A further object of the present invention is to provide a process and apparatus of the foregoing type for blow molding oriented containers from tubular preforms or parisons.

Yet, a further object of the invention is to provide a process and apparatus of the foregoing type which provides greater flexibility in the selection of the axial draw ratio of the tubular parison from which the container is molded, thereby permitting greater control of the properties of the blown container.

Still a further object of the invention is to provide a process and apparatus of the foregoing type in which a controlled quantity of axially oriented material is provided to form well-defined closure attachment elements on the container neck.

These and other objects of the present invention are achieved in a blow molding process and apparatus having a dual-diameter blow pin with a larger-diameter calibrating portion equal to the inner diameter of the finished neck opening and a smaller-diameter portion on the leading end. A crammer sleeve is reciprocally disposed about the blow pin and a gripping clamp is positioned to close around the blow pin. A heated tubular parison is placed onto the larger-diameter portion of the blow pin and is clamped thereon by the gripping clamp. The parison is stretched, causing it to neck down to a first thickness on the smaller-diameter portion of the blow pin which establishes a quantity of material available for forming the container neck, and forming a yet thinner-walled portion at the end of the pin which ultimately forms the body of the blown container. The mold sections are closed, the parison is blown, the blow pin is longitudinally inserted to calibrate or size the neck's inner opening, and the crammer sleeve is advanced to push additional oriented material to finish form the neck and to sever surplus material to form a finished neck opening. The neck forming areas of the mold sections are configured in the region where the neck surplus material is severed to provide a controlled amount of oriented material which is crammed to form the neck.

BRIEF DESCRIPTION OF THE DRAWINGS

The above description, as well as further objects, features and advantages of the present invention, will be more fully appreciated by reference to the following description of a presently-preferred but nonetheless illustrative embodiment in accordance with the invention, and the accompanying drawings, wherein.

DESCRIPTION OF THE PREFERRED EMBODIMENT

Figure 1:
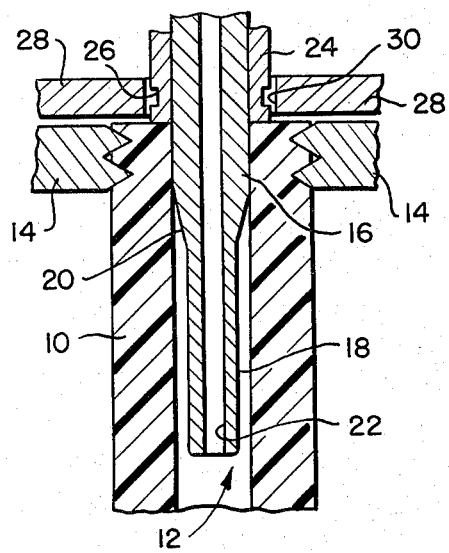
FIG. 1 is a cross-sectional view of a portion of the apparatus of the present invention.

Referring now to FIG. 1 of the drawings, a tubular preform or parison 10 has an end portion positioned over a blow pin or mandrel, designated generally as 12, and is held thereon between the jaws of a gripper clamp 14. The parison 10, a length of tubular, orientable material, has been heated to a suitable orientation temperature. The blow pin 12 has a larger-diameter portion 16 connected to a smaller-diameter end portion 18 by a tapered, intermediate portion 20. Extending along the longitudinal axis of the blow pin 12 is a central passage or conduit 22 through which pressurized fluid is introduced in a known manner to blow mold a container within a mold cavity in a known fashion. The blow pin 12 is connected to a conventional mechanism (not shown) which moves the blow pin up and down along its longitudinal axis.

A tubular crammer sleeve 24 is disposed coaxially about an upper portion of the blow pin 12 and, as shown, contacts the upper end surface of the parison 10. Adjacent to the free end of the crammer sleeve 24 is a circumferential recess or notch 26, the purpose of which will be described more fully below. The crammer sleeve 24 is connected to a conventional actuating mechanism (not shown) which moves the sleeve up and down over the blow pin 12, independently of the blow pin.

Positioned above the upper surface of the gripper clamp 14 and the upper end surface of the parison 10 is a stripper plate 28 with an aperture 30 through which the blow pin 12 and crammer sleeve 24 freely pass. The stripper plate 28 is stationarily supported to assist in the removal of the top surplus material from the crammer sleeve 24, as will be described more fully below.

Figure 2:
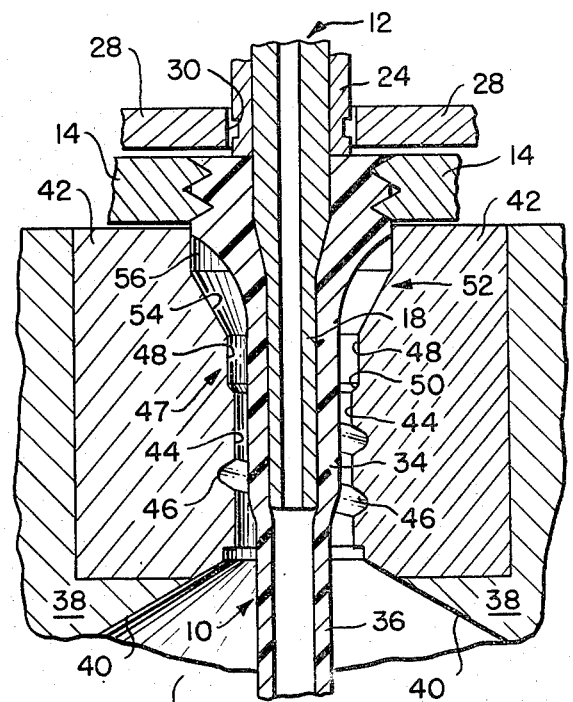
FIG. 2 is a view similar to FIG. 1, wherein the parison has been longitudinally stretched and the mold sections have closed thereon.
Figure 2:
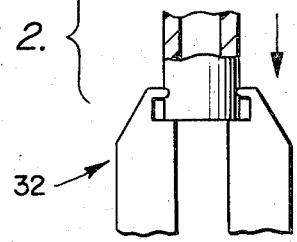

Referring now to FIG. 2 of the drawings, the lower end portion of the parison 10 has been grasped by a clamp 32 and stretched longitudinally, thus axially orienting the parison material. By way of illustration, the clamp 32 may conveniently be used to place the parison onto the blow pin 12, and during its withdrawal effect the stretching of the parison. Such a technique is disclosed in the applicants' co-pending application Ser. No. 169,141, filed July 15, 1980. During the stretching, the parison necks down in the container neck area 34 and stops at a first wall thickness when its inside surface reaches the surface of the smaller-diameter portion 18 of the blow pin 12. This first wall thickness provides a quantity of material used in the formation of the finished container neck. The parison necking process continues below the end of the blow pin 12, to a second, thinner wall thickness portion 36 which will be blown to form the body of container. Mold sections 38 of a separable mold have been closed upon the stretched parison by conventional means (not shown). Each mold section 38 has a cavity 40 which defines the contours of the container and a neck forming insert 42 disposed above the cavity. The neck forming insert 42 has a cylindrical surface 44 provided with a number of recessed, concave grooves 46. The cylindrical surface 44 forms the outside surface of the finished container neck and the grooves 46 form the threads on the outer surface of the neck. While thread-forming grooves are shown, it would also be possible to form other types of projections for attachment of a container closure, such as lugs or the like. The outside diameter of the blow pin portion 16 is substantially the same as the inside diameter of the finished container neck opening and the outside diameter of the crammer sleeve 24 is substantially the same as the outside diameter of the finished container neck at the base of the neck threads or similar attachment means. The diameter of the blow pin portion 18 is sized such that when the parison 10 is stretched the thickness of the stretched material in this region provides a controlled or determined quantity of axially-oriented material which is used in the formation of the finished container neck. By proper sizing of the diameter of blow pin portion 18, the amount of material available can be controlled when the parison 10 is blown into contact with the neck forming inserts 42, to that required to obtain the desired container neck inner and outer diameters. Subsequently, oriented material provided by the crammer sleeve 24 is then only needed to form the closure threads, as will be described more fully below.

Above the thread-forming grooves 46, in the region of the finished, open end of the container neck, the neck forming inserts 42 are provided with a recessed region or reservoir 47 which is defined, for illustration purposes, by a cylindrical sidewall 48 connected at its lower end by an inclined surface 50 to the cylindrical surface 44 of the insert 42. The cylindrical sidewall 48 has a larger diameter than the cylindrical surface 44, and the inclined interconnecting surface 50 may be oriented at any suitable angle, such as 30° relative to the vertical direction. The inclined surface 50 may be fabricated of a suitable, hardened material and cooperate with the crammer sleeve 24 to sever surplus material from the neck region and finish form the open end of the container. The volume afforded by the reservoir 47 provides a controlled amount of axially-oriented material which may be forced by the crammer sleeve 24 into the neck forming inserts 42 to form well-defined threads on the container neck, as will be described more fully below.

The foregoing configuration for the reservoir 47 of a cylindrical wall and inclined-lower surface is illustrative only. Other appropriate configurations for the sidewall and the lower surface may be used as long as the reservoir provides a controlled volume of axially oriented material which is available to be forced by the crammer into the neck forming inserts.

As shown in FIG. 2, the upper portion of each neck forming insert 42 has another recessed region 52 of generally truncated shape which, for example, may have a conical surface 54 extending above the cylindrical sidewall 48 and merging into a straight, cylindral zone 56. The recessed region 52 provides a receiving space in the insert 42 for the parison material displaced by movement of the blow pin 12 and crammer sleeve 24, thus removing the material from the movement path and providing for easier passage of the blow pin and the crammer sleeve. Additionally, after the mold sections 38 have closed and the gripper clamps 14 have released the parison 10, the recessed region 52 provides space to receive the upper portion of the parison pushed therein by movement of the crammer sleeve 24.

The operation of the blow molding apparatus can be discerned by reference to the drawings. The parison 10 is placed upon the larger-diameter portion 16 of the blow pin 12 by a suitable means, such as the clamp 32 which has grasped the lower end portion of the parison (FIGS. 1 and 2). The tapered portion 20 of the blow pin 12 serves to guide and center the parison 10 onto the blow pin, and the end of the crammer sleeve 24 serves as a stop to correctly position the parison relative to the gripper clamps 14. The gripper clamps 14 are then closed upon the parison 10, securely holding the parison onto the blow pin 12, and the clamp 32 longitudinally stretches the parison into the configuration shown in FIG. 2 as it withdraws from the mold. Subsequent to the longitudinal stretching of the parison 10, or concurrently therewith, the mold sections 38 are closed onto the parison. As can be seen from FIG. 2, the smaller-diameter portion 18 of the blow pin 12 is sized so that the stretched parison, after it has necked down onto this portion of the blow pin, has an outer diameter less than the final outer diameter of the finished container neck as defined by the cylindrical surface 44 of the neck forming inserts 42. This provides a space surrounding the parison to prevent formation of a flash when the mold sections are closed.

Figure 3:
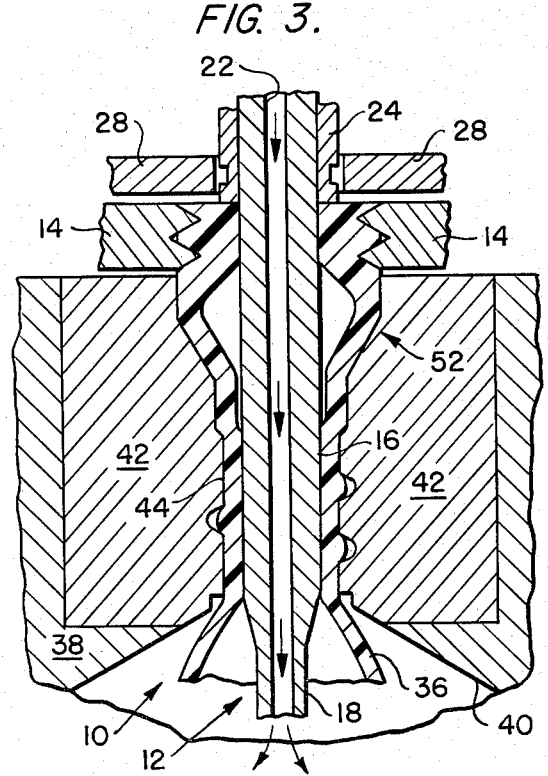
FIG. 3 is a view as in FIG. 2, wherein the blow pin has been longitudinally inserted to calibrate the neck opening.

As shown in FIG. 3, after the parison 10 has been longitudinally stretched and mold closure has commenced, pressurized fluid is introduced through the blow pin central passage 22, forcing the parison against the contoured surfaces of the neck forming inserts 42 and causing the lower portion 36 of the stretched parison to begin to assume the shape of the mold cavity 40. More particularly, the parison 10 is displaced against the recessed region 52, to form a bulbous or bubble like configuration, and against the cylindrical surface 44. The blow pin 12 is longitudinally inserted through the parison 10 to further force the neck portion of the parison into conformity with the cylindrical surface 44 of the neck forming inserts 42 and simultaneously to size or calibrate the inside diameter of the container neck opening. Displacement of the parison against the inserts 42 by the pressurized fluid permits easier passage of the blow pin 12.

Figure 4:
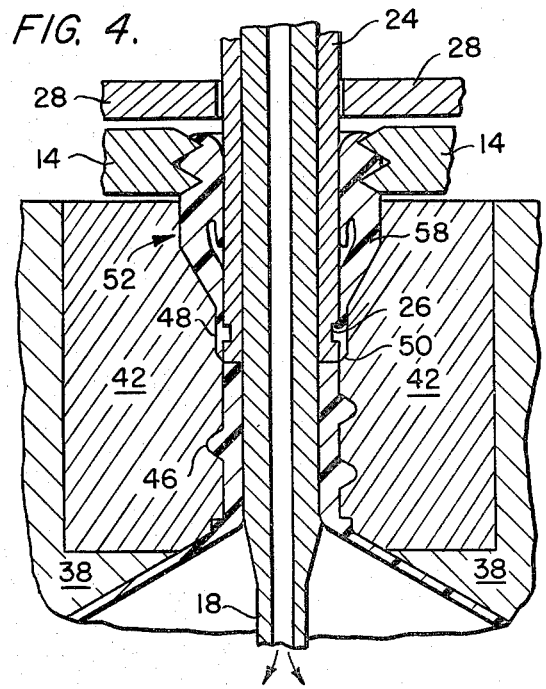
FIG. 4 is a view as in FIG. 3, wherein the crammer sleeve has been longitudinally inserted.

The crammer sleeve 24 is inserted longitudinally into the parison 10, forcing oriented material contained within the reservoir 47 into the thread-forming grooves 46 to finish form well-defined threads on the exterior surface of the container neck (FIG. 4). When the crammer sleeve 24 is fully advanced, as shown in FIG. 4, the lower end surface of the sleeve abutts the inclined lower surface 50 of the reservoir 47 to sever surplus material 58 from the neck and to provide a finished end surface for the open end of the neck. It can also be seen that the still malleable condition of the parison material in the region around the lower end portion of the crammer sleeve 24 causes some of the material to be forced into the circumferential groove 26 adjacent to the end of the crammer sleeve where the material attaches until subsequently removed.

FIG. 4 illustrates another advantageous feature of the recessed region 52 in the inserts 42 and the parison material bubble formed by the pressurized fluid. As the crammer sleeve 24 is advanced, there is a tendency for the parison material to cling to the sleeve and move along with it. The interior volume of the bubble provides a space into which this material can be displaced, thus removing an obstruction to the sleeve movement and eliminating a possible adverse effect upon the amount of axially oriented material which is crammed into the container neck.

While not specifically shown in the drawings, the gripper clamps 14 may be retracted after the mold sections 38 have closed onto the stretched parison. Retraction of the gripper clamps 14 facilitates passage of the blow pin 12 and crammer sleeve 24 through the parison 10. As noted above, movement of the upper end portion of the parison 10 caused by operation of the blow pin 12 and crammer sleeve 24 subsequent to the retraction of the gripper clamps 14 is accommodated by the recessed region 52 so that the parison material does not hinder passage of the crammer sleeve.

Figure 5:
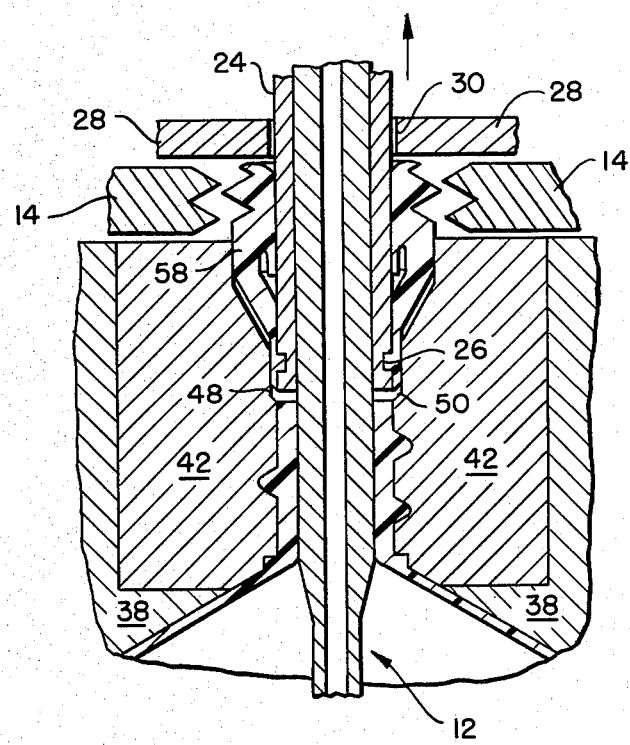
FIGS. 5 and 6 are views as in FIG. 4, showing different stages in the separation of the mold sections and retraction of the blow pin and crammer sleeve.
Figure 6:
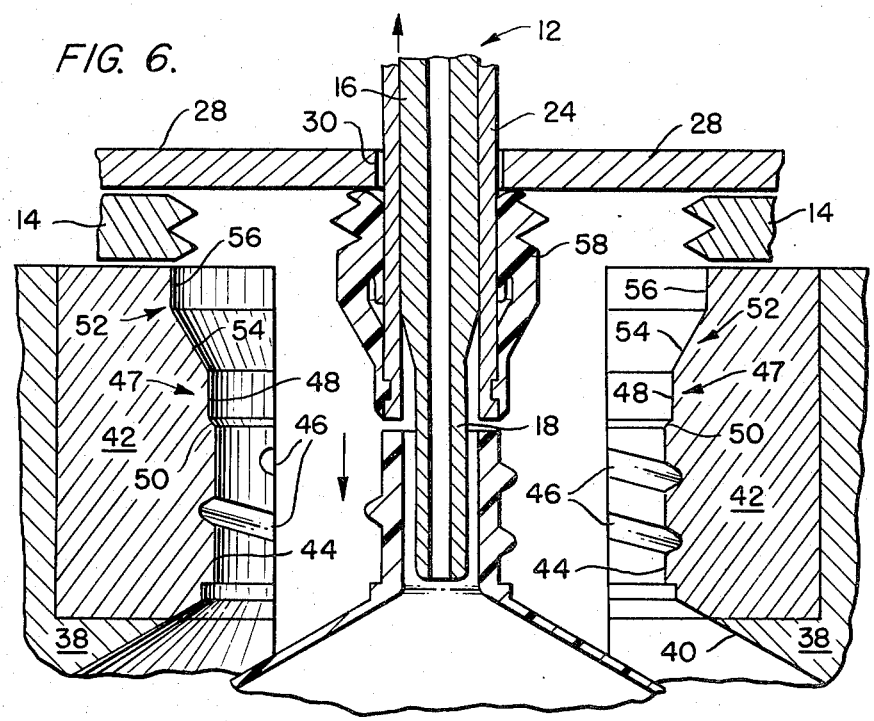
Figure 7:
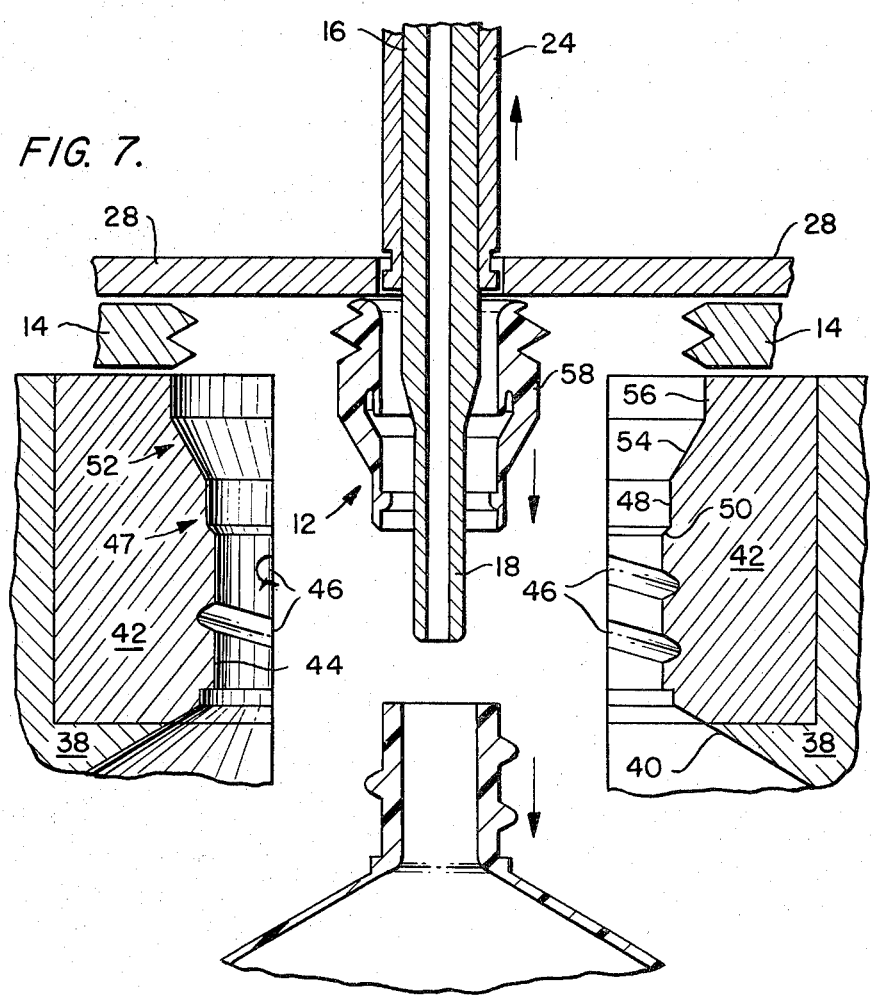
FIG. 7 is a view as in FIG. 5, wherein the blow pin and crammer sleeve have been fully retracted and the molded container is being removed.

After the container has been blown for an appropriate time, the crammer sleeve 24 is retracted to separate the severed surplus material 58 from the finished container, the mold sections 38 are separated, and the blow pin 12 is retracted. As shown in FIGS. 5, 6 and 7, retraction of the crammer sleeve 24 lifts the severed surplus material 58 from the end of the finished neck, and upon separation of the mold sections 38, the container drops by gravity from the mold. During its descent, the finished container is guided off the blow pin 12 by the lower, smaller-diameter portion 18 of the blow pin. The neck surplus material 58 adhering onto the circumferential notch 26 of the crammer sleeve 24 can be readily knocked off upon retraction of the crammer sleeve through the aperture 30 in the stripper plate 28.

It is contemplated that a control system or similar means would be provided to regulate movement of the components and the sequence and duration of the operational features of the blow molding apparatus as described above. Thus, the closing of the gripper clamps 14 onto the positioned parison 10, the stretching of the parison and the closing of the mold sections 38 would be appropriately correlated and controlled. Similarly, the steps of inserting the blow pin 12, introducing the pressurized fluid through the passage 22, and inserting the crammer sleeve 24 would be properly sequenced and timed. In this regard, while the operational sequence described above provides for insertion of the blow pin 12 after the introduction of the pressurized fluid, these two steps may occur simultaneously. As noted above, introduction of the pressurized fluid just before or simultaneously with blow pin insertion is advantageous since the stretched parison in the container neck region is distended to permit the blow pin to be inserted more easily.

It is important to note that the timing relationship between the various operational sequences described above are critical due to the cooling of the parison within the mold cavity. It is, therefore, also within the scope of this invention to cram the oriented material in the neck region before, during, or after blowing of the container body, depending upon the cooling residence time required for the particular material utilized, once the container neck opening has been calibrated. It is also within the scope of this invention to control the blow pin temperature by direct application of heat, by cooling or by use of insulated material for the blow pin to prevent the neck material from cooling during the stretching of the parison and closing of the mold, thereby enhancing the ability of the crammer sleeve to displace the material into the neck forming inserts.

This invention is applicable to the formation of any article having biaxial molecular orientation and a relatively small neck or thread area compared with the body portion of the article. The invention is applicable for the production of these articles from any orientable thermoplastic resin, such as polyolefins, poly(vinyl chlorides), acrylonitrile-butadiene-styrene polymers, styrene-butadiene copolymers, various styrene polymers and copolymers, polyamides, polyvinylidene chloride polyers and copolymers, and the like. Preferred resins include crystalline polymers such as polymers of at least one mono-1-olefin having 2–8 carbon atoms per molecule, and more preferably, polymers and copolymers of ethylene, propylene, and 1-butene, with polypropylene being especially preferred.

Although not particularly illustrated in the drawings, it is understood that all the components described above are arranged and supported in an operative fashion to form a complete and operative system. Further, it is understood that all ancillary components such as actuation means, fluid coupling, control systems and components, etc., have not been specifically described, but such components are known in the art and would be appropriately incorporated into the operative system. Of course, variations of the specific construction and arrangement of the blow molder disclosed above can be made by those skilled in the art without departing from the invention as defined in the appended claims.

We claim:

1. An apparatus for blow molding a finished, hollow, biaxially oriented container from a tubular parison of orientable plastic material heated to a suitable orientation temperature for the material, comprising:
   a blow pin having a first portion of a first diameter for receiving an end portion of the parison and a second portion of a smaller diameter;
   means for introducing a pressurized fluid through the blow pin;
   gripping means disposed adjacent to and movable towards the blow pin for clamping an end portion of the parison onto said first portion of the blow pin;
   a tubular sleeve slidably disposed about the blow pin;
   means cooperating with the gripping means for longtudinally stretching the parison;
   separable mold sections disposed to close over the blow pin, each section having a container forming and neck finishing cavity; and
   operating means that cause (a) the gripping means to clamp an end portion of the parison onto the first portion of the blow pin, (b) the stretching means to stretch the parison along the longitudinal axis of the parison, axially orienting the parison material and causing the parison to neck down onto the second, smaller-diameter portion of the blow pin, (c) the mold sections to close the container forming and neck finishing cavities about the blow pin and the stretched parison, (d) the introducing means to introduce pressurized fluid into the stretched parison to transversely stretch the parison material and form the molded container, and (e) the tubular sleeve to be moved along the longitudinal axis of the blow pin, from a first position above the gripping means, to a second position with the sleeve within the gripping means and the neck finishing region of the cavity to cram oriented material into the cavity.

2. The apparatus as defined in claim 1, including additional means operable to move the blow pin longitudinally along the blow pin axis, said means operable to move the blow pin into the neck finishing region of the cavity to transversely stretch the parison material and calibrate the inside opening of the container neck.

3. The apparatus as defined in claim 1, wherein the neck finishing region of the cavity of each mold section has a recessed portion with a sidewall of a larger diameter than the outer diameter of the neck, said recessed portion providing a reservoir for a controlled volume of longitudinally-stretched parison material which is crammed into the neck finishing cavities by the tubular sleeve.

4. The apparatus as defined in claim 3, wherein the recessed portion has an annular surface which coacts with the tubular sleeve to sever surplus parison material.

5. The apparatus as defined in claim 1, wherein the smaller-diameter portion of the blow pin is sized to provide an annular clearance between the stretched parison and the neck finishing region of the cavity of each mold section with the mold sections closed.

6. The apparatus as defined in claim 1, wherein the smaller-diameter portion of the blow pin is sized to provide a controlled volume of longitudinally-stretched parison material required to form the container neck.

7. The apparatus as defined in claim 3 or 4, wherein the neck finishing region of the cavity of each mold section has a second recessed portion disposed suprajacent to said recessed portion, said second recessed portion providing space to receive an end portion of the parison during the blow molding of the container.

* * * * *